US007730476B2

(12) United States Patent
Zilavy (10) Patent No.: US 7,730,476 B2
(45) Date of Patent: Jun. 1, 2010

(54) FIELD-REPLACEABLE UNIT REVISION COMPATIBILITY

(75) Inventor: Daniel V. Zilavy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1386 days.

(21) Appl. No.: 10/611,558

(22) Filed: Jul. 1, 2003

(65) Prior Publication Data

US 2005/0005269 A1   Jan. 6, 2005

(51) Int. Cl.
    *G06F 9/445* (2006.01)
(52) U.S. Cl. .................. 717/170; 717/169; 717/171
(58) Field of Classification Search .................. 717/170, 717/168, 174
    See application file for complete search history.

(56) References Cited

U.S. PATENT DOCUMENTS

| 5,623,604 | A | 4/1997 | Russell et al. | |
|---|---|---|---|---|
| 5,727,215 | A | 3/1998 | Rynaski et al. | |
| 5,812,857 | A | 9/1998 | Nelson et al. | |
| 5,937,198 | A | 8/1999 | Nelson et al. | |
| 6,237,091 | B1 | 5/2001 | Firooz et al. | |
| 6,243,773 | B1 | 6/2001 | Mahalingam | |
| 6,266,809 | B1 | 7/2001 | Craig et al. | |
| 6,272,678 | B1 * | 8/2001 | Imachi et al. | 717/122 |
| 6,360,362 | B1 | 3/2002 | Fichtner et al. | |
| 6,467,088 | B1 * | 10/2002 | alSafadi et al. | 717/173 |
| 6,473,899 | B1 | 10/2002 | Nelson et al. | |
| 6,477,611 | B1 | 11/2002 | Chang | |
| 6,477,629 | B1 * | 11/2002 | Goshey et al. | 711/162 |
| 6,532,535 | B1 * | 3/2003 | Maffezzoni et al. | 713/1 |
| 6,898,768 | B1 * | 5/2005 | Theodossy et al. | 716/5 |
| 6,948,059 | B1 * | 9/2005 | Sprecher et al. | 713/100 |
| 2002/0052910 | A1 | 5/2002 | Bennett et al. | |
| 2003/0014470 | A1 | 1/2003 | Iijima | |
| 2003/0140134 | A1 * | 7/2003 | Swanson et al. | 709/223 |
| 2004/0199899 | A1 * | 10/2004 | Powers et al. | 717/120 |

FOREIGN PATENT DOCUMENTS

| EP | 0535600 A | 4/1993 |
|---|---|---|
| EP | 0275448 A | 7/1998 |
| EP | 0860778 A1 | 8/1998 |
| EP | 1335283 A1 | 8/2003 |

OTHER PUBLICATIONS

"Escort: a decentralized and localized access control system for mobile wireless access to secured domains", Kong et al., Sep. 2003, pp. 51-60. Second ACM Workshop on Wireless Security (WISE'03), in Conjunction with MOBICOM. Online retrieved at <http://delivery.acm.org/10.1145/950000/941320/p51-kong.pdf>.

"Upgrading transport protocols using untrusted mobile code", Patel et al., ACM Symposium on Operating Systems Principles, Dec. 2003, pp. 1-14. Online retrieved at <http://delivery.acm.org/1 0.1145/950000/94544 7/p1-patel.pdf>.

"Version control in the inscape environment", D. Perry, Proceedings of the 9th International Conference on Software Engineering, Mar. 1987, pp. 142-149. Online retrieved at <http://delivery.acm.org/1 0.1145/50000/41780/p142-perry.pdf>.

FR search report dated Feb. 20, 2008 by I. de Junca.

* cited by examiner

*Primary Examiner*—Tuan Q Dam
*Assistant Examiner*—Isaac T Tecklu (57) ABSTRACT

In a computer system including a first field-programmable unit including first field-programmable unit (FPU) code, computer-implemented techniques are disclosed for determining whether the first FPU code is compatible with the computer system and, if the first FPU code is determined not to be compatible with the computer system, notifying a user of the computer system of the incompatibility.

30 Claims, 8 Drawing Sheets

| RECIPE # | FPU ID | | | | FRU ID | | | | CURRENT RECIPE? |
|---|---|---|---|---|---|---|---|---|---|
| | A | B | C | D | A | B | C | D | |
| 0 | 0 | 0 | 0 | 1 | 0 | 1 | 0 | 1 | N |
| 1 | 0 | 0 | 0 | 2 | 0 | 1 | 1 | 3 | N |
| 2 | 0 | 1 | 0 | 1 | 2 | 1 | 2 | 2 | Y |
| 3 | 0 | 1 | 2 | 2 | 3 | 0 | 3 | 1 | N |
| 4 | 1 | 0 | 3 | 1 | 1 | 1 | 0 | 3 | N |
| 5 | 1 | 1 | 3 | 2 | 2 | 1 | 0 | 2 | N |
| 6 | 2 | 0 | 0 | 1 | 3 | 3 | 1 | 2 | N |
| 7 | 2 | 0 | 3 | 2 | 0 | 0 | 3 | 3 | N |

FIELD-REPLACEABLE UNIT REVISION COMPATIBILITY

CROSS REFERENCE TO RELATED APPLICATIONS

This application is related to a commonly-owned and concurrently-filed U.S. patent application Ser. No. 10/610,657 entitled "Field-Replaceable Unit Revision Compatibility," which is hereby incorporated by reference.

BACKGROUND

1. Field of the Invention

The present invention relates to computer systems that include field-replaceable units (FRUs).

2. Related Art

Every computer includes both hardware and software. The hardware of a computer includes electromechanical components such as microprocessors, buses, input/output (I/O) controllers, memory, and mass storage devices (such as hard disk drives). It can be difficult to maintain and repair such components, particularly as they become more and more complex and miniaturized. Increasingly, it is not feasible to attempt to perform an electrical or mechanical repair on a component such as a bus or I/O controller. Rather, often the best that a technician faced with a malfunctioning computer can do is to identify the component that is the source of the problem and to physically replace the identified component with a new component. Such a repair process can be tedious, time-consuming, and costly because it requires a human technician to diagnose the cause of the malfunction, open the computer housing, physically remove (and possibly dispose of) the malfunctioning component, and physically install the new component. Although the process of diagnosing computer malfunctions is becoming increasingly automated, the component replacement process must still be performed manually.

In early computer systems it was often difficult or impossible to replace certain hardware components—such as the central processing unit (CPU), memory, and I/O controllers—after the computer had been manufactured. Such components might, for example, be hardwired together, in which case attempting to remove any of such components might irreversible damage the computer. In some cases, it might be possible to remove such components by breaking and re-establishing physical connections by soldering or using some other tedious and time-consuming process requiring a skilled technician to perform.

Computer hardware designers are increasingly designing computer systems so that components (such as the CPU, memory, and I/O controllers) can be replaced easily in the field (i.e., at user locations). A component that can be easily removed from a computer and replaced with a new component in the field is referred to as a "field-replaceable unit" (FRU). Modern computers increasingly include modular hardware interfaces which allow FRUs to be removed easily by a relatively unskilled technician. Removing an FRU may, for example, only require removing a few screws and pulling the FRU out of the computer. The same technician may then install a replacement FRU with the same ease. Although the use of FRUs decreases the difficulty, cost, and time required to replace a hardware component, field-replacement of FRUs still requires a human technician to remove and replace the defective FRU.

Software, in contrast, is embodied in the form of electromagnetic signals stored in a mass storage device (e.g., a hard disk drive) or other form of electronic memory. It has therefore traditionally been possible to replace or update faulty or outdated software merely by erasing the old software and replacing it with new software provided on a tangible storage medium, such as a floppy diskette or CD-ROM. Updating or replacing software, therefore, traditionally has been significantly easier and less costly to perform than hardware replacement. The widespread use of computer networks and the Internet has further simplified the process of updating software by making it possible to download software over a network and install it—in some cases without any human intervention—without the need to distribute the software on a physical medium such as a floppy diskette.

There is now a trend in computer hardware design to implement various hardware components in ways that make it possible for hardware to be updated and effectively replaced in a manner that is similar to the manner in which it traditionally has been possible to update and replace software. The term "field-programmable unit" (FPU) refers to a hardware component whose functionality may be modified by electronically programming it. Examples of FPUs include system firmware (e.g., BIOS), embedded enclosure process firmware, and Field-Programmable Gate Arrays (FPGAs). Each of these kinds of FPUs is capable of storing electrical signals representing code that dictates, in whole or in part, the functions performed by the FPU. The functionality of an FPU, therefore, may be modified merely by modifying the code (in the form of electrical signals) stored in the FPU.

It may be necessary or desirable to re-program an FPU in any of a variety of circumstances. For example, the code stored in an FPU may become out-of-date, in which case it may be desirable to update the code in the FPU to enable it to perform new functions. As another example, the code stored in a newly-installed FPU may be incompatible with other hardware in the system, in which case it may be necessary to update the FPU's code with code that is compatible with the other hardware in the system. The code in an FPU may also become corrupted, in which case it may be necessary to re-load fresh code into the FPU to restore it to a functional state.

In all of these cases, the primary advantage of the FPU over conventional forms of hardware is that the FPU may be repaired or effectively replaced merely by storing new code in the FPU. New code may be stored in an FPU using a process that is similar to the process by which software is updated. For example, a human technician may provide the code to the computer using a floppy diskette or by downloading the code over a network. The technician may then instruct the computer to store the new code in the FPU, a process which may typically be performed quickly and without requiring the technician to open the computer housing or perform any physical modifications to the computer. Repairing an FPU can therefore be significantly less tedious, time-consuming and expensive than repairing a conventional hardware component.

Although an FRU (field-replaceable unit) need not be field-programmable, an FRU may include one or more FPUs (field-programmable units). An FRU may therefore be field-programmable as well as field-replaceable. In a particular computer system, it is possible for the FPU code stored in an FRU to be incompatible with other FPU code in the system or with hardware components of the system. Such incompatibilities may cause the system to malfunction. It is desirable to avoid such incompatibilities to maintain proper system function.

SUMMARY

Techniques are disclosed for ensuring that code in a field-replaceable unit (FRU) installed in a computer system is compatible with other components of the computer system. The computer system may include a plurality of FRUs, each of which may have a particular revision number. Each of the FRUs may include one or more field-programmable units, each of which may include its own code having its own revision number. A revision compatibility matrix specifies mutually-compatible combinations of FRU revisions and FPU code revisions. When a new FRU is installed in the system, the revision compatibility matrix is used to determine whether code in the new FRU is compatible with the other FRUs in the system. If the code in the new FRU is not compatible, the system may identify compatible code suitable for use in the new FRU and install such code in the new FRU.

Although certain embodiments of the present invention will now be described in terms of method steps, such steps may be implemented as computer program instructions tangibly embodied in a computer-readable medium. In one embodiment of the present invention, for example, a computer-implemented method is provided for use in a computer system including a first field-programmable unit including first field-programmable unit (FPU) code. The method includes steps of: (A) determining whether the first FPU code is compatible with the computer system; and (B) if the first FPU code is determined not to be compatible with the computer system, notifying a user of the computer system of the incompatibility. The first field-programmable unit may be field-replaceable.

The computer system may further include a plurality of field-programmable units including a corresponding plurality of FPU codes, and the step (A) may include a step of: (A)(1) determining whether the first FPU code is compatible with the plurality of FPU codes. The computer system may further include a plurality of field-replaceable units, and the step (A) may further include a step of: (A)(2) determining whether the first FPU code is compatible with the plurality of field-replaceable units.

The computer system may further include a revision compatibility descriptor identifying a plurality of compatible combinations of field-replaceable units and field-programmable unit codes, and the step (A) may include a step of determining that the first FPU code is compatible with the computer system if a combination of the first FPU code, the plurality of FPU codes, and the plurality of field-replaceable units is among the plurality of compatible combinations of field-programmable unit codes and/or field-replaceable units identified by the revision compatibility descriptor.

The step (B) may include a step of: (B)(1) providing the user with information descriptive of second FPU code that is suitable for storage in the first field-programmable unit and that is compatible with the computer system. The step (A) may be performed in response to replacement of a second field-programmable unit with the first field-programmable unit, and the second field-programmable unit may include the second FPU code.

In another embodiment of the present invention, a computer-implemented method is provided for use in a computer system including a first field-programmable unit including first FPU code and a second field-programmable unit including second FPU code. The method includes steps of: (A) after replacement of the second field-programmable unit by the first field-programmable unit, determining whether the first FPU code is different from the second FPU code; and (B) notifying a user of the computer system that the first field-programmable unit is incompatible with the computer system if it is determined that the first FPU code is different from the second FPU code.

The step (B) may include a step of providing the user with information descriptive of third FPU code that is suitable for storage in the first field-programmable unit and that is compatible with the computer system. The third FPU code may, for example, be the second FPU code.

In yet another embodiment of the present invention, a computer-implemented method is provided for use in a computer system including a first field-programmable unit including first FPU code. The method includes steps of: (A) determining whether the first FPU code is compatible with the computer system; (B) if the first FPU code is determined not to be compatible with the computer system, identifying second FPU code that is compatible with the computer system and suitable for installation in the first field-programmable unit; and (C) installing the second FPU code in the first field-programmable unit.

BRIEF DESCRIPTION OF THE DRAWINGS

As described in more detail below, the methods illustrated in the drawings by flowcharts may be implemented by computer programs.

DETAILED DESCRIPTION

Techniques are disclosed for ensuring that code in a field-replaceable unit (FRU) installed in a computer system is compatible with other components of the computer system. The computer system may include a plurality of FRUs, each of which may have a particular revision number. Each of the FRUs may include one or more field-programmable units, each of which may include its own code having its own revision number. A revision compatibility matrix specifies mutually-compatible combinations of FRU revisions and FPU code revisions. When a new FRU is installed in the system, the revision compatibility matrix is used to determine whether code in the new FRU is compatible with the other FRUs in the system. If the code in the new FRU is not compatible, the system may identify compatible code suitable for use in the new FRU and install such code in the new FRU.

Figure 1:
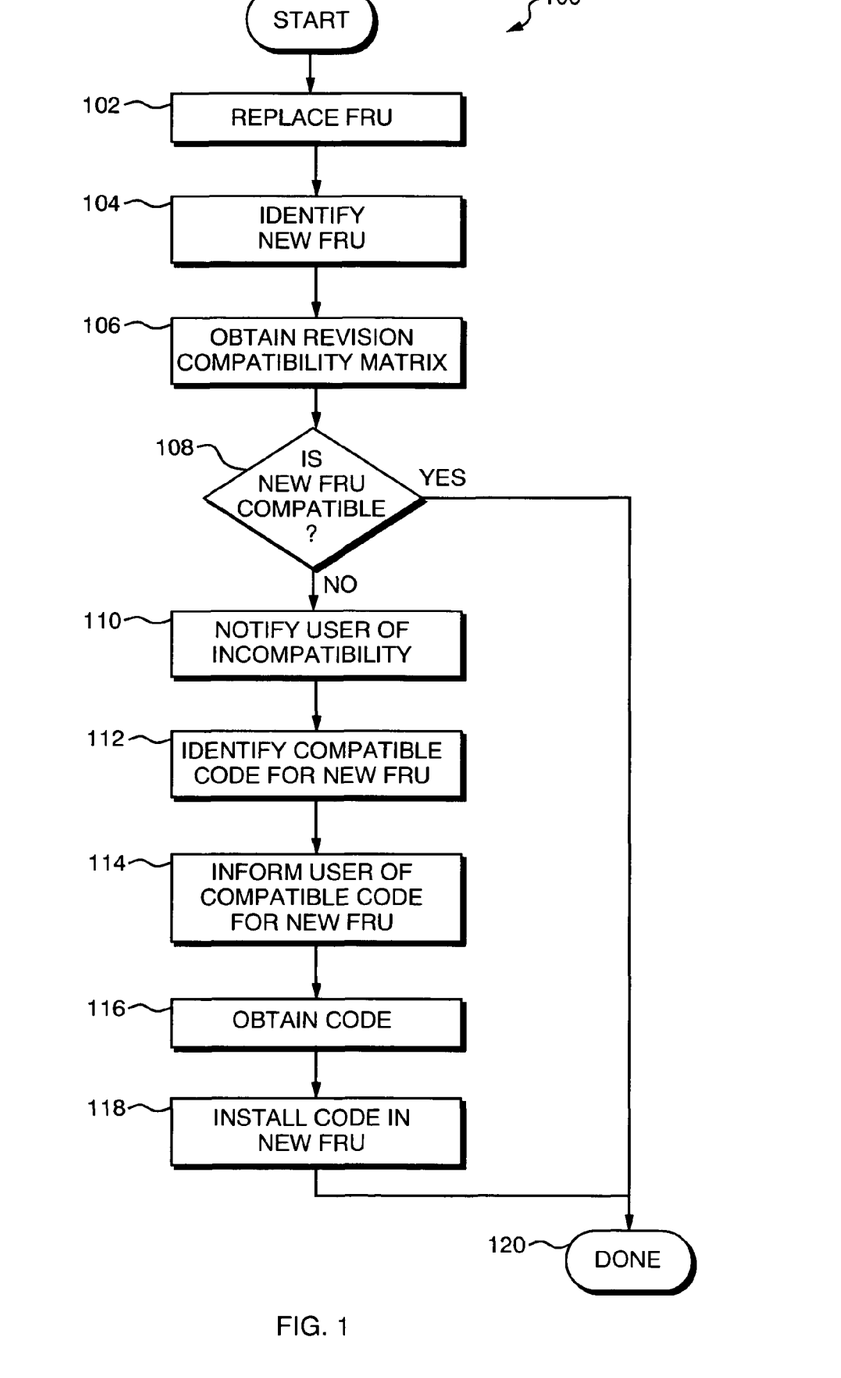
FIG. 1 is a flowchart of a method that is used in one embodiment of the present invention to ensure that code in an FRU is compatible with the computer system in which it has been installed.
Figure 6A:
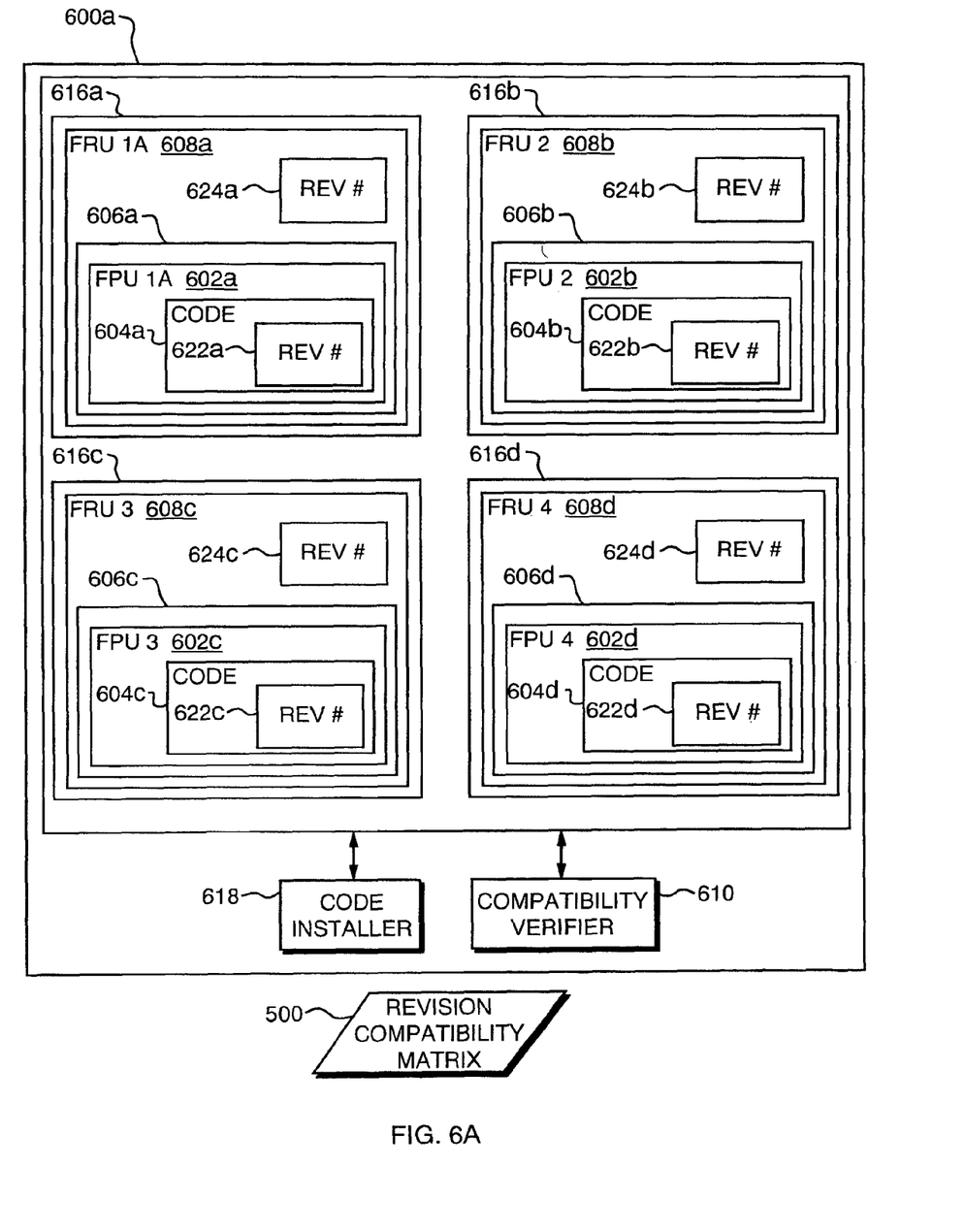
FIG. 6A is a functional block diagram of a computer system prior to the installation of a new FRU according to one embodiment of the present invention.

Referring to FIG. 1, a flowchart is shown of a method 100 that is used in one embodiment of the present invention to ensure that code in a newly-installed FRU is compatible with the computer system in which it has been installed. Referring to FIG. 6A, a functional block diagram is shown of a computer system 600a in which the method 100 may be used.

The computer system 600a may, for example, be a desktop computer, laptop computer, workstation, mainframe, or any other kind of computer system. Although the computer system 600a includes at least one processor, main memory, a system bus, and the other components commonly included in a computer system, such components are not shown in FIG. 6A for ease of illustration. Rather, only those elements that are relevant to the discussion of the method 100 are shown in FIG. 6A.

In particular, the computer system 600a includes four field-replaceable units (FRUs) 608a-d. FRUs 608a-d may, for example, be implemented as printed circuit assemblies (PCAs). FRUs 608a-d include revision numbers 624a-d, respectively. In the embodiment illustrated in FIG. 6A, each of the revision numbers 624a-d represents a hardware revision number of the corresponding FRU. The revision numbers 624a-d may, for example, be stored in serial EEPROMs on the PCAs that implement the FRUs 608a-d.

FRUs 608a-d are installed in FRU slots 616a-d, respectively. The FRU slots 616a-d need not be "slots," but rather may more generally include any kind of connective circuitry or other components for connecting the FRUs 608a-d, respectively, to the system 600a.

FRUs 608a-d include field-programmable units (FPUs) 602a-d, respectively. Field-programmable units 602a-d include field programmable unit code 604a-d, respectively. Code 604a-d includes revision numbers 622a-d, respectively. As described in more detail below, each of the revision numbers 622a-d represents a revision number of the corresponding code 604a-d.

FPUs 602a-d may be any kind of FPUs, such as system firmware, embedded enclosure processor firmware, or FPGAs. FPUs 602a-d are installed in FPU slots 606a-d, respectively. Like the FRU slots 616a-d, the FPU slots 606a-d may include any kind of connective circuitry or other components for connecting the FPUs 602a-d to the FRUs 608a-d, respectively. In the embodiment illustrated in FIGS. 6A-6B, each of the slots 606a-d is designed to receive an FPU of a particular type. For example, slot 606a may be designed to receive firmware implementing the system BIOS, while slot 606b may be designed to receive an FPGA implementing a particular I/O controller.

Although four FRUs 608a-d, four FPUs 602a-d, and corresponding slots 616a-d and 606a-d are shown in FIG. 6A for purposes of example, the system 600a may include any number and kind of FRU and FPU in any combination. In particular, an FRU may include, zero, one, or more FPUs.

Consider an example in which the FRU 608a is replaced (FIG. 1—step 102). For example, referring to FIG. 6B, a computer system 600b is shown which is the same as computer system 600a except that FRU 608a has been replaced with an FRU 608e, which has a revision number 624e, and which includes an FPU 602e including code 604e having revision number 622e. The reference numeral 600 is used herein to refer generically to the computer systems 600a-b when differences between the two are not relevant. As will be described in more detail below, the revision number 624e of replacement FRU 608e may be the same as or differ from the revision number-624a of the original FRU 608a, and the code 604e in replacement FPU 602e may be the same as or differ from the code 604a in original FPU 602a. The replacement of FRU 608a by FRU 608e will typically be performed by a human operator in response to the identification of a malfunction or other problem with original FRU 608a.

The method 100 identifies the new FRU 608e (step 104). The system 600 may, for example, include a compatibility verifier 610 that has access to FRUs 608b-e and which may perform step 104. The method 100 may identify the new FRU 608e in any of a variety of ways. For example, the method 100 may identify the new FRU 608e by extracting its revision number 624e and the revision numbers of code in any FPUs in the new FRU 608e. In the present example, this would involve extracting the FRU revision number 624e and the FPU code revision number 622e.

It is common for the first revision (also referred to as a "release") of an FRU or FPU code to have a revision number of 1 (or 1.0), and for subsequent revisions to have higher revision numbers (such as 1.1 for a minor release and 2.0 for a major release). Different revisions of code for the same FPU may, for example, include code that fixes bugs from previous revisions or that adds additional features to the FPU.

Figure 6B:
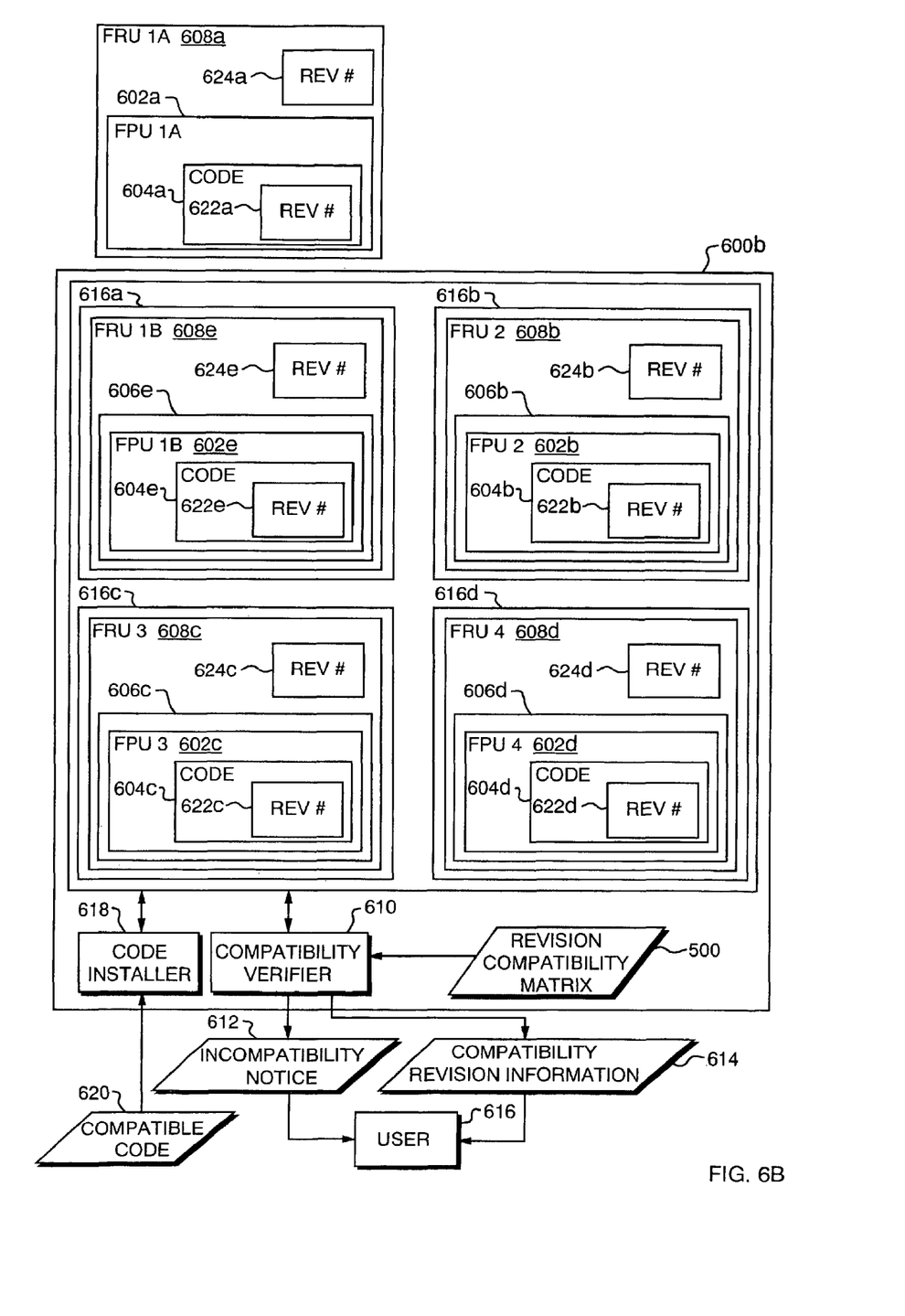
FIG. 6B is a functional block diagram of the computer system of FIG. 6A after the installation of a new FRU according to one embodiment of the present invention.

The term "field-programmable unit code" (FPU code) refers to a set of code intended for use in a field-programmable unit. For example, codes 604a-e are all field-programmable unit codes. A particular combination of FRUs and field-programmable unit codes that may be installed in a computer system is referred to herein as a "recipe." For example, the particular combination of FRUs 608a-d and FPU codes 604a-d installed in the system 600a. (FIG. 6A) is an example of a recipe, as is the particular combination of FRUs 608b-e and FPU codes 604b-e installed in the system 600b (FIG. 6B). A particular recipe may, for example, be represented as a list of FRU revision numbers and FPU code revision numbers. The term "revision" is used herein to refer generally both to FRU revisions and to FPU code revisions.

The combination of FRU revisions and FPU code revisions represented by a particular recipe may or may not be compatible with each other. A recipe may, for example, specify a combination of codes which, if installed in the FPUs in slots 606a-d, will cause the computer system 600a to malfunction. A combination of FPU codes which, if installed in the FPUs in slots 606a-d, do not interfere with each other's operation are referred to herein as "mutually-compatible codes." It is desirable that only recipes including mutually-compatible FPU codes be installed in a computer system. More generally, a combination of FRU revisions and FPU code revisions which, if installed in a computer system, do not interfere with each other's operation are referred to herein as "mutually-compatible revisions." A recipe which specifies a combination of mutually-compatible revisions is referred to herein as a "compatible recipe."

Figure 5:
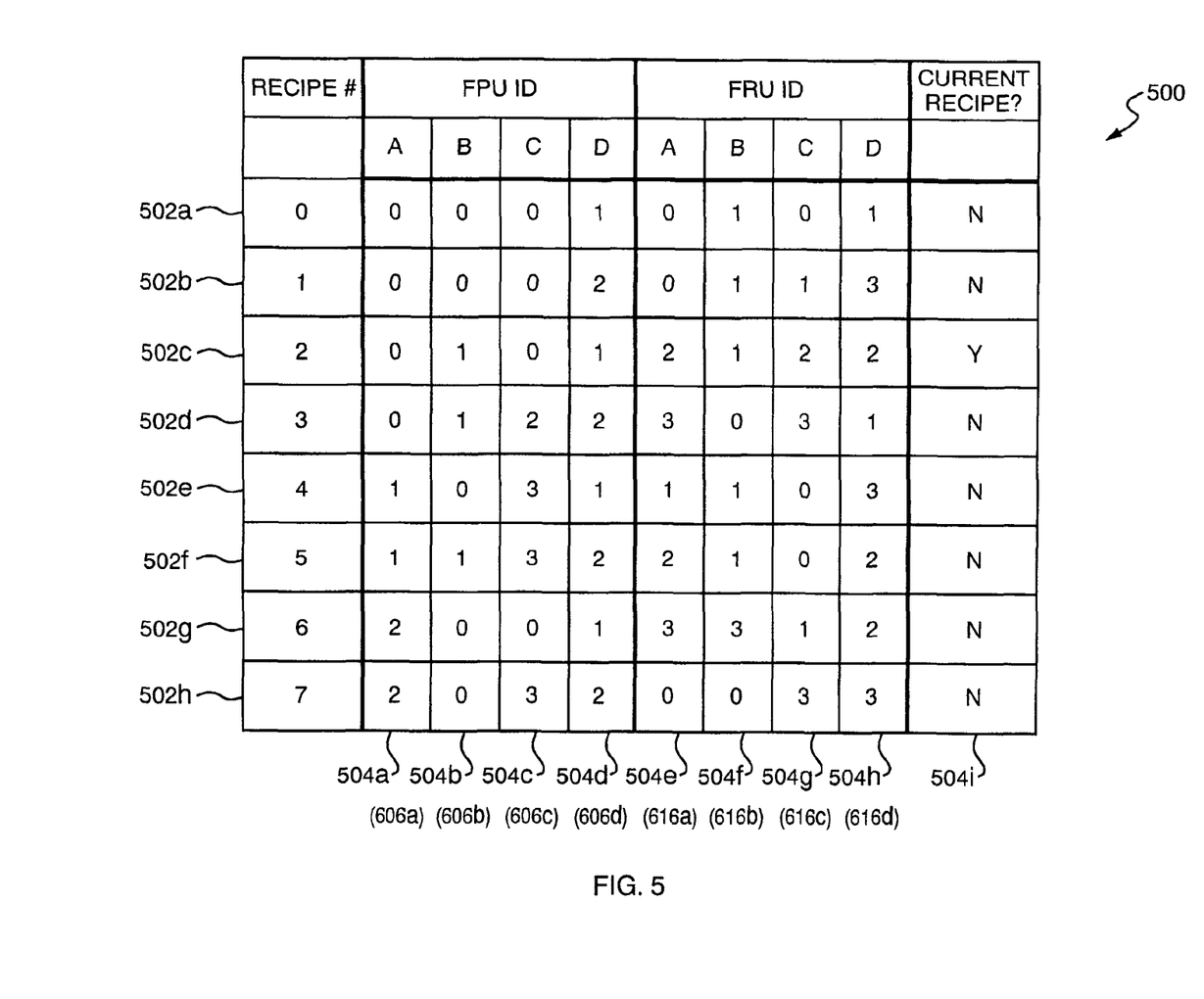
FIG. 5 is a diagram of a revision compatibility matrix according to one embodiment of the present invention.

In one embodiment of the present invention, a revision compatibility matrix 500 specifies compatible recipes suitable for use in the computer system 600. The revision compatibility matrix 500 may, for example, be generated by installing and testing various combinations of FRU revisions and FPU code revisions in computer system 600, identifying combinations of revisions that are mutually compatible, and recording the identified combinations of mutually-compatible revisions in the revision compatibility matrix 500.

Referring to FIG. 5, an example of the revision compatibility matrix 500 is shown according to one embodiment of the present invention. The revision compatibility matrix 500 shown in FIG. 5 includes eight rows (records) 502a-h, each of which specifies a particular compatible recipe suitable for use in the computer system. Revision compatibility matrix 500 includes: (1) columns 504a-d, corresponding to FPU slots 606a-d, respectively (as indicated by the parenthetical reference numerals below columns 504a-d); (2) columns 504e-h, corresponding to FRU slots 616a-d, respectively (as indicated by the parenthetical reference numerals below columns 504e-h); and (3) column 504i, which indicates the most-recently recognized recipe installed in the system 600.

Each of the FPU slots 606a-d is referred to by a particular FPU identifier (FPU ID) shown at the tops of columns 504a-d. In particular, FPU slots 606a-d are referred to by the FPU IDs A, B, C, and D, respectively, in FIG. 5. Similarly, each of the FRU slots 616a-d is referred to by a particular FRU identifier (FRU ID) shown at the tops of columns 504e-h.

Each row of the revision compatibility matrix 500 specifies a particular compatible recipe as a set of FPU code revision numbers and FRU revision numbers. For example, row 502h specifies a recipe in which: (1) code revision 2 is stored in the FPU in slot 606a; (2) code revision 0 is stored in the FPU in slot 606b; (3) code revision 3 is stored in the FPU in slot 606c; (4) code revision 2 is stored in the FPU in slot 606d; (5) an FRU having revision 0 is installed in FRU slot 616a; (6) an FRU having revision 0 is installed in FRU slot 616b; (7) an FRU having revision 3 is installed in FRU slot 616c; and (8) an FRU having revision 3 is installed in FRU slot 616d.

Note that in the present embodiment a particular set of FPU code may be identified by a combination of FPU ID and revision number. For example, the combination of FPU ID "A" and revision number "2" identifies FPU code for use in FPU slot 606a and having revision number 2. This particular scheme for identifying FPU code, however, is presented merely for purposes of example and does not constitute a limitation of the present invention. Other identification schemes may alternatively be used to identify particular FPU code in the revision compatibility matrix 500. The same is true for FRU revision numbering.

Returning to FIG. 1, the method 100 may obtain the revision compatibility matrix 500 (step 106). For example, as shown in FIG. 6B, the revision compatibility matrix 500 may be provided as an input to the compatibility verifier 610. The method 100 may obtain the revision compatibility matrix 500 in any of a variety of ways. For example, the method 100 may download the revision compatibility matrix 500 over a network from a known remote location using techniques that are well-known to those of ordinary skill in the art. The revision compatibility matrix 500 need not, however, be stored remotely. The revision compatibility matrix 500 may, for example, be stored in the system 600, in which case the method 100 may perform step 106 by obtaining, for example, a pointer to the matrix 500. In other words, step 106 need not require transmitting the matrix 500 over a network connection or copying the matrix 500.

The method 100 determines whether the new FRU (in this example, FRU 608e) is compatible with the computer system 600b (step 108). If the method 100 determines that the new FRU 608e is compatible with the computer system 600b, the method 100 terminates (step 120).

If the method 100 determines that the new FRU 608e is not compatible with the computer system 600b, the method 100 notifies a user 616 of the system 600b of the incompatibility (step 110). For example, the compatibility verifier 610 may provide an incompatibility notice 612 to the user 616, such as by displaying an onscreen message notifying the user 616 of the incompatibility.

If the incompatibility identified in step 108 was an FPU code incompatibility, the method 100 identifies code suitable for installation in the new FRU 608e and that is compatible with the computer system 600b (step 112). Such code is referred to herein as "compatible code." For example, referring to FIG. 6B, assume that the method 100 identifies compatible code 620 suitable for installation in the new FPU 602e. Note that if more than one incompatible FPU code revision is identified in step 108, more than one set of compatible code may be identified in step 112.

The method 100 provides the user 616 with information descriptive of the compatible code 620 identified in step 112 (step 114). For example, the compatibility verifier 610 may provide the user 616 with a compatibility revision information message 614 describing the compatible code 620 identified in step 112. The message 614 may, for example, include a Uniform Resource Locator (URL) or other descriptor of a location from which the code 620 may be downloaded. In one embodiment of the present invention, the user 616 may use the information in the message 614 to obtain and install the compatible code 620 in the new FPU 602e.

In the embodiment illustrated in FIG. 1, however, the method 100 automatically obtains the compatible code 620 identified in step 112 (step 116). The system 600b may, for example, include a code installer 618 which downloads the code 620 identified in step 112 over a network from a remote location. The location of the code 620 may be determined based on the FPU slot with which the code 620 is associated and the revision number of the code 620. As an alternative to downloading the code 620 over a network, the system 600b may include all of the code revisions listed in the revision compatibility matrix 500, and the code installer 618 may obtain the code 620 from within the system 600 based on the FPU slot with which the code 620 is associated and the revision number of the code 620. The method 100 may also inform the user 616 that the code 620 is going to be installed in the new FPU 602e and provide the user 616 with the option of aborting the installation if desired.

Once the code 620 has been obtained, the method 100 installs the code 620 in the FPU 602e installed in the FPU slot 606a (step 118). Step 118 may, for example, be performed by the code installer 618. Upon completion of step 118, the method 100 terminates (step 120). Upon completion of the method 100, the new FPU 602e should be able to operate in a manner that is compatible with the remaining FPUs 602b-d and with the other components of the computer system 600.

Figure 2:
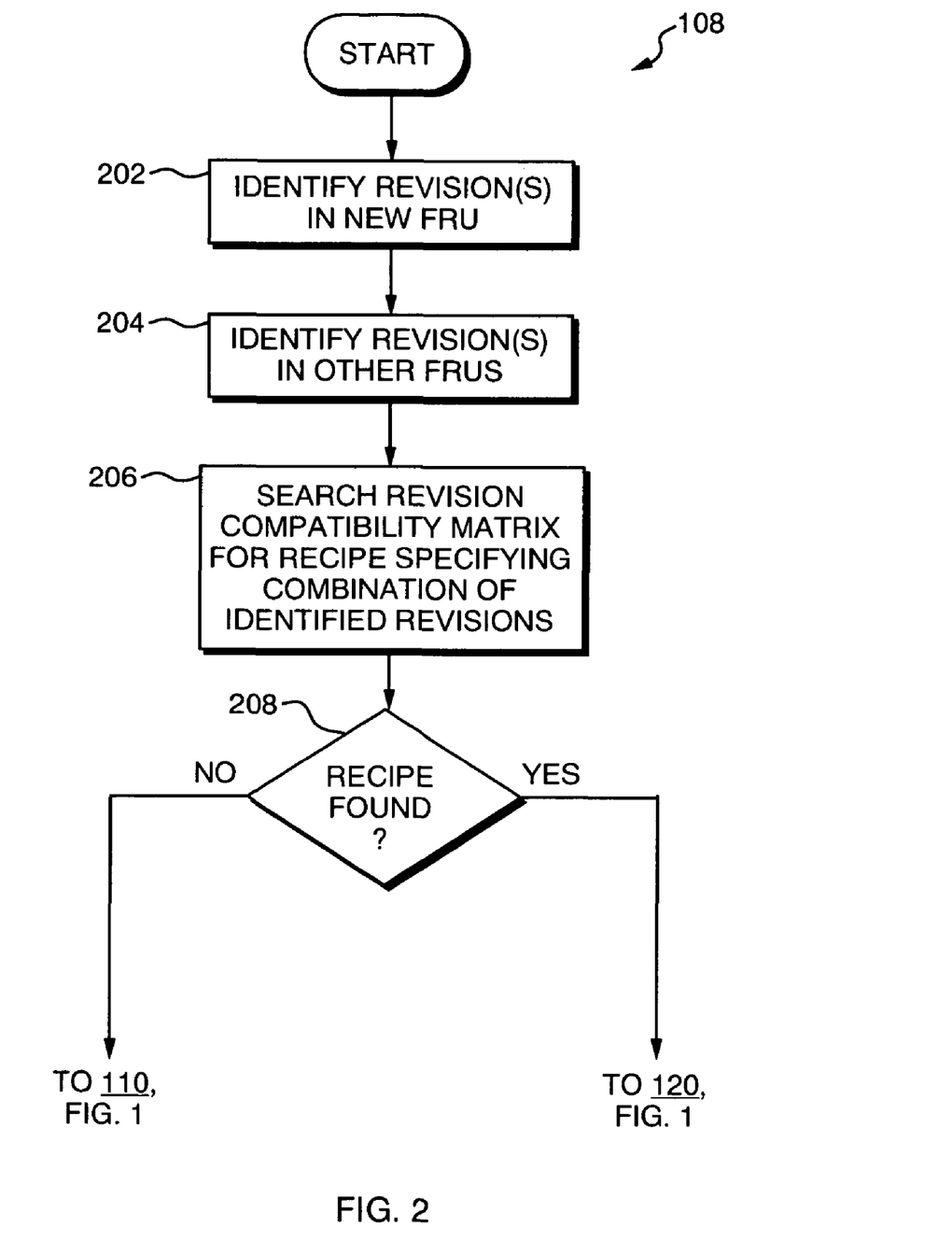
FIG. 2 is a flowchart of a method for determining whether code in a newly-installed FRU is compatible with the computer system in which it is installed.

Having described in general the operation of the method 100, various embodiments of the present invention will now be described in more detail. Recall that the method 100 may determine whether the new FRU 608e is compatible with the computer system 600b (FIG. 1, step 108). Referring to FIG. 2, a flowchart is shown which illustrates particular techniques that may be used to determine whether the new FRU 608e is compatible with the computer system 600b.

Referring to FIG. 2, the method 108 identifies the revisions in the new FRU 608e (step 202). Step 202 may include, for example, identifying the revision number 624e of the FRU 608e itself, the revision number(s) of FPU code installed in any FPUs in the FRU 608e (e.g., revision number 622e), or both.

The method 108 identifies the (FRU and/or FPU code) revisions in the other FRUs 608b-d in the system 600b (step 204). The method 108 may identify these revisions in the same way in which it identifies the revisions in the new FRU 608e or in any other manner.

In one embodiment of the present invention, the result of performing steps 202 and 204 is a list of FRU revision numbers and FPU code revision numbers reflecting the FRU revisions and FPU code revisions currently installed in the system 600. For example, the result of steps 202 and 204 may be a list of the FRU revision numbers 624b-e and the FPU code revision numbers 622b-e.

The method 108 searches the revision compatibility matrix 500 for a recipe specifying the combination of revisions identified in steps 202 and 204 (step 206). For example, if the code revision numbers of the FPUs 602e, 602b, 602c, and 602d are 1, 1, 3, and 2, respectively, and the revision numbers of the FRUs 608e, 608b, 608c, and 608d are 2, 1, 0, and 2, respectively, then the method 108 searches in step 206 for a recipe specifying the combination 11322102. The method 108 would find such a recipe in row 502f of the matrix 500.

The method 108 determines whether a recipe specifying the combination of revisions identified in steps 202 and 204 was found in step 206 (step 208). If such a recipe was found, the method 108 proceeds to step 120 of method 100 (FIG. 1), in which case the method 100 terminates. If no such recipe was found, the method 108 proceeds to step 110 of method 100 (FIG. 1)

Figure 3A:
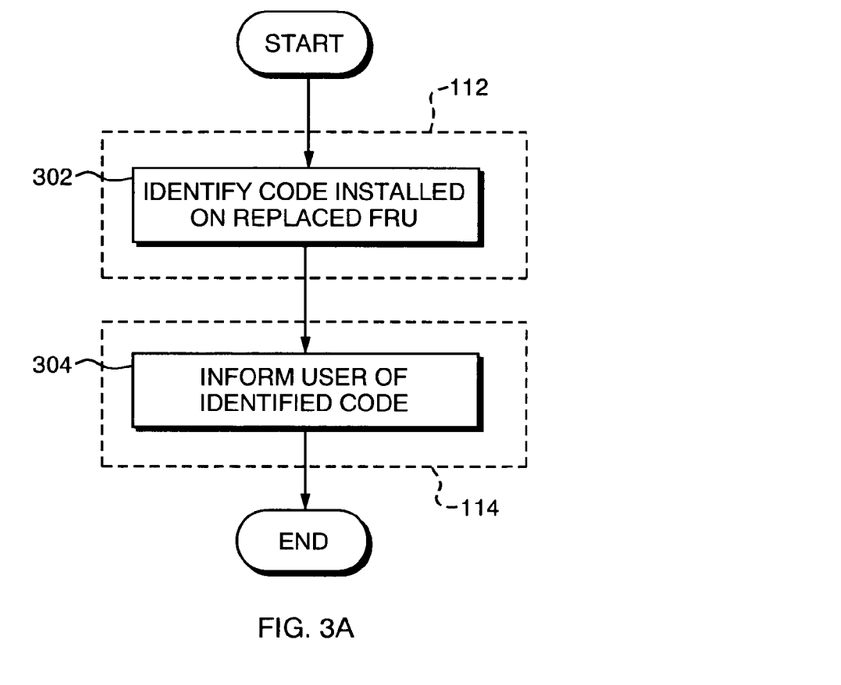
FIG. 3A is a flowchart of a method for identifying code installed in an FRU that has been removed from a computer system according to one embodiment of the present invention.
Figure 3B:
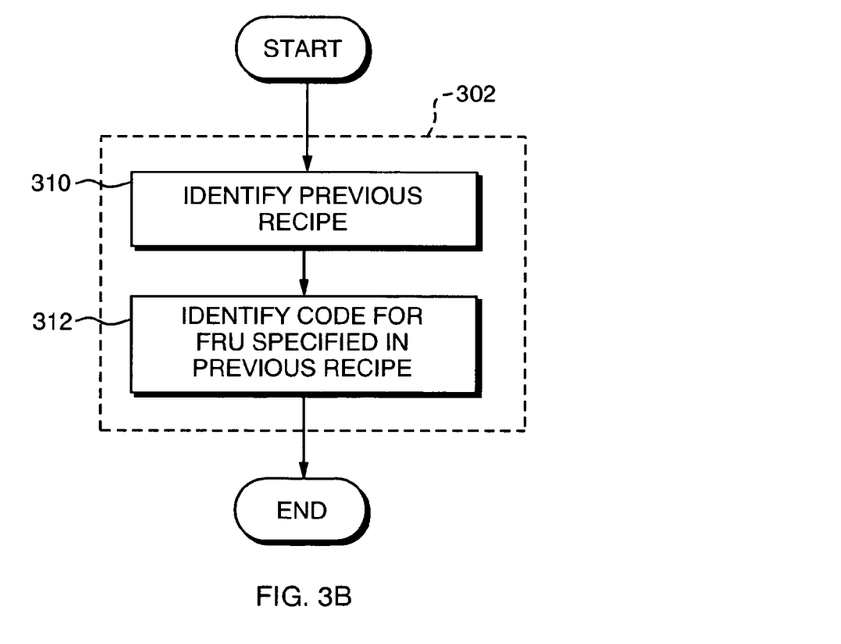
FIG. 3B is a flowchart of a method for identifying code installed in an FRU that has been removed from a computer system according to another embodiment of the present invention.
Figure 3C:
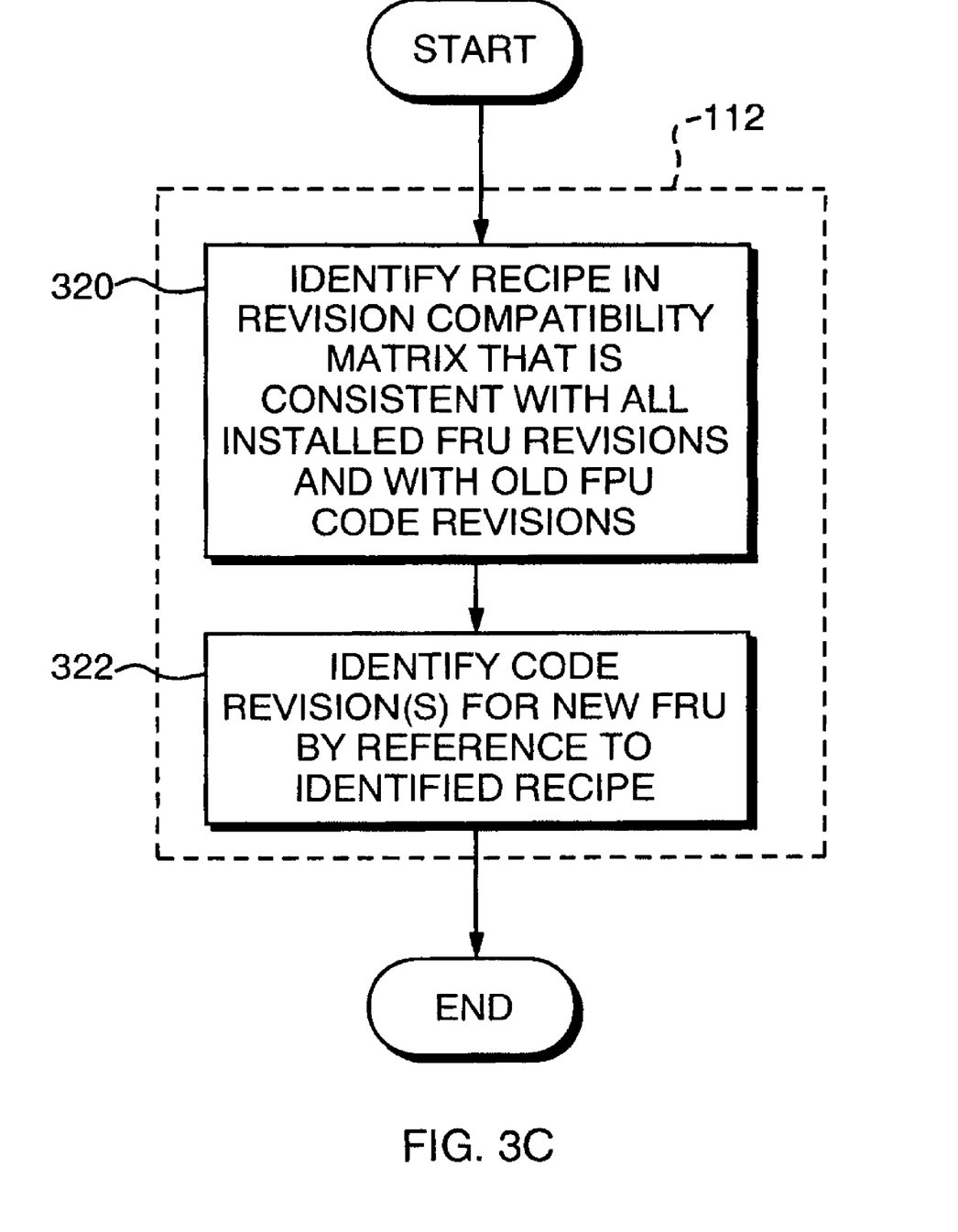
FIG. 3C is a flowchart of a method for identifying code suitable for installation in an FRU that has been installed in a computer system according to one embodiment of the present invention.

It was stated generally above that the method 100 may identify code that is compatible with the computer system 600b and that is suitable for installation in one or more FPUs in the new FRU 608e (step 112), and that the method 100 may provide the user 616 with information about the identified code (step 114). Referring to FIG. 3A, a flowchart is shown of a method that is used in one embodiment of the present invention to perform steps 112 and 114. FIGS. 3A-3C will be described with respect to a particular example in which the code 622e in the new FPU 602e was found to be incompatible in step 108. The methods shown in FIGS. 3A-3C may, however, be applied more generally to identify compatible code suitable for installation in one or more FPUs in an FRU.

The method shown in FIG. 3A identifies code suitable for installation in the new FRU 608e by identifying code that was installed in the previously-installed FRU 608a (step 302). For example, if the code 622e in the new FPU 602e was determined to be incompatible with the system 600b in step 108, the method shown in FIG. 3A may identify the code 604a that was installed in the previously-installed FPU 602a. The method shown in FIG. 3A informs the user 616 of compatible code for the new FRU 608e by informing the user 616 of the previously-installed code (e.g., code 604a) (step 304), such as by providing the revision number 622a of the code 604a to the user 616.

The method 100 may identify the code 604a installed in the previously-installed FRU 608a (step 302) in any of a variety of ways. The computer system 600b may, for example, include a record identifying the code 604a installed in the FPU 604a. For example, referring again to FIG. 5, current recipe column 504i may specify the recipe installed in the system 600 prior to installation of the new FRU 608e. This recipe is referred to herein as the "current recipe" even though it may not reflect the actual system recipe once the new FRU 608e has been installed.

In the example shown in FIG. 5, the matrix row representing the current recipe is indicated by a special value such as ("Y", "True", or 1) in the current recipe column 504i. For example, as shown in FIG. 5, the value of the current recipe column 504i of record 502c is equal to "Y", indicating that the recipe represented by record 502c is the current recipe. The value "N" is stored in the current recipe column 504i of the remaining records 502a-b and 502d-h, indicating that they do not represent the current recipe.

Referring to FIG. 3B, a flowchart is shown of a method that may be used to identify the FPU code 604a installed in the previous FRU 608a (FIG. 3A, step 302) according to one embodiment of the present invention. In particular, the method shown in FIG. 3B may identify the code 604a installed in the previous FPU 602a by identifying the system recipe that existed prior to installation of the new FRU 608e (step 310). The method 100 may identify the previous system recipe by, for example, identifying the record in the revision compatibility matrix 500 that has a value of "Y" in its current recipe column 504i.

The method shown in FIG. 3B may identify the code revision that the current recipe specifies for the FPU slot in which the new FPU 602e is installed (step 312). The method may identify this code revision by identifying the revision number stored in the column corresponding to the previous FPU 602a (e.g., column 504a). In the example shown in FIG. 5, this revision number is zero (i.e., the value stored in row 502c, column 504a).

It should be appreciated that the use of the current recipe column 502i, and the techniques just described for using the current recipe column 502i, are provided merely for purposes of example and do not constitute limitations of the present invention. Other techniques may be used to identify the code that was installed in a previously-installed FPU. For example, the system 600b may include a separate list indicating the current recipe and one or more prior recipes. Such a list may be used to identify code previously installed in a particular FPU slot.

Referring to FIG. 3C, a flowchart is shown of a method that is used in another embodiment of the present invention to identify compatible code suitable for installation in one or more FPUs in the new FRU 608e without use of the current recipe column 504i. The method shown in FIG. 3C identifies a recipe in the revision compatibility matrix 500 that is consistent with the FRU revisions of all FRUs installed in the system 600 and with the code revisions installed in the old FPUs (e.g., the FPUs 606b-d) (step 320).

Assume, for example, that FRUs 608e, 608b, 608c, and 608d have revision numbers 2, 1, 0, and 2, respectively, and that FPUs 602b-d include code having revision numbers 1, 3, and 2, respectively. In such a case, the method shown in FIG. 3C may identify row 502f in step 320 as representing a recipe that is consistent with the installed FRUs 608b-e and with the code revisions installed in FPUs 602b-d. Row 502f may be identified using any of a variety of computer-implemented pattern-matching techniques that are well-known to those of ordinary skill in the art.

The method shown in FIG. 3C may identify, in the row identified in step 320, the code revision number(s) for the FPU(s) installed in the new FRU 608e (step 322). In the present example, the new FPU 602e is installed in slot 606a, corresponding to column 504a in the matrix 500. The method may therefore identify the code revision number stored in column 504a of row 502f in step 322. This code revision number identifies a code revision that is suitable for installation in the new FPU 602e and that is compatible with the code revisions installed in the other FPUs 602b-d and with the revisions of the FRUs 608b-e.

If the revision compatibility matrix 500 includes multiple records that are consistent with the FRU revisions and FPU code revisions currently installed in the system 600, the method may (in step 320) identify such multiple records and identify (in step 322) multiple code revision numbers corresponding to the FPU slot in the which the new FPU 602e is installed. The method 100 may, in such a case, inform the user 616 of the multiple identified code revisions, thereby providing the user 616 with a choice of code revisions to install in the new FPU 602e. The method 100 may, for example, provide the user 616 with additional information to assist in the selection of an appropriate code revision to install in the new FPU 602e. For example, the method 100 may list all compatible code revisions in descending order of revision number, so that the most recent revision is listed first. Although in the typical case the most recent revision is the most desirable revision to install, in some cases the user 616 may choose to install an earlier revision based on considerations such as stability or feature set.

Figure 4:
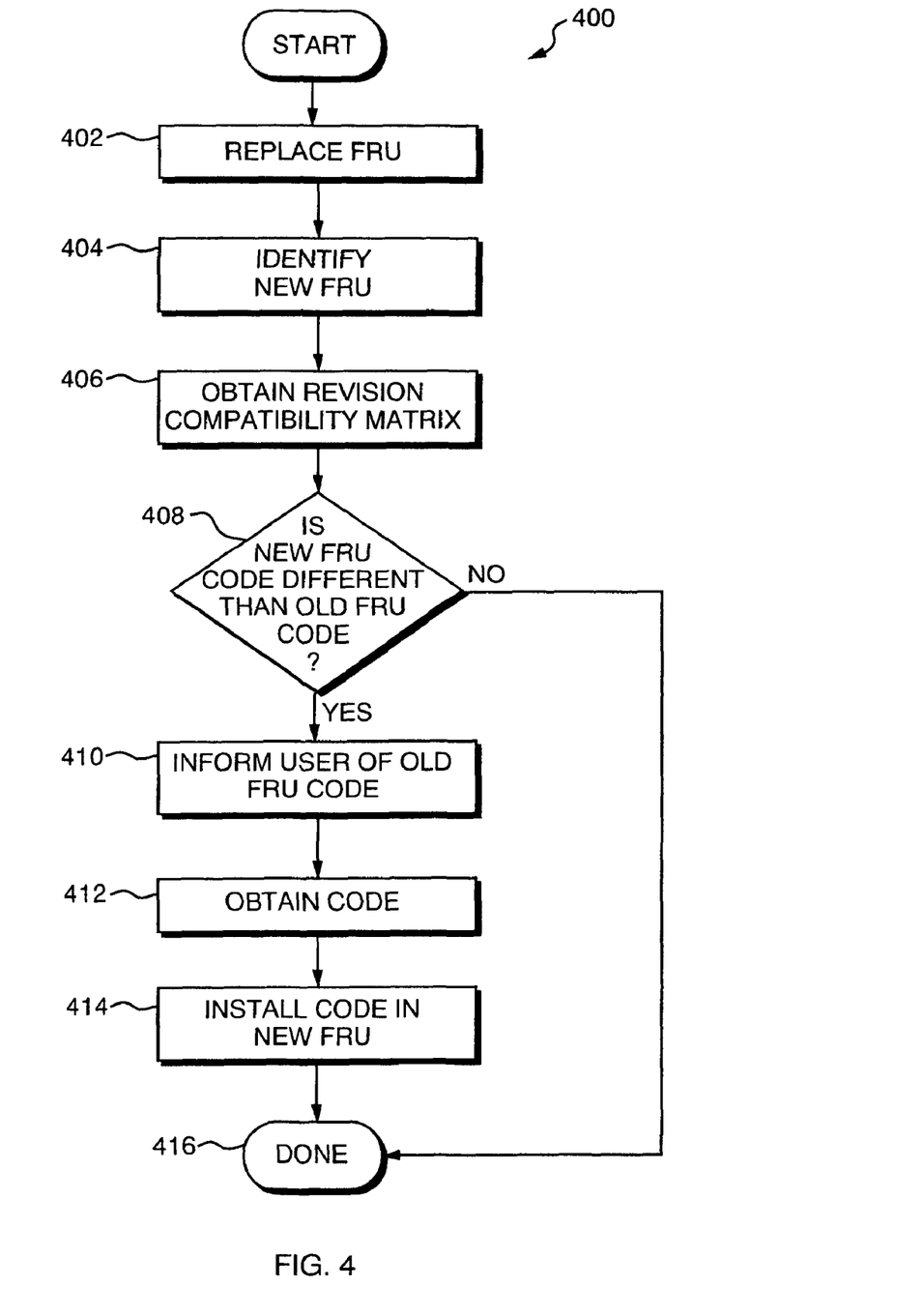
FIG. 4 is a flowchart of a method that is used in another embodiment of the present invention to ensure that code in an FRU is compatible with the computer system in which it has been installed.

Referring to FIG. 4, a flowchart is shown of a method 400 that is used in another embodiment of the present invention to ensure that FPU code in the newly-installed FRU 608e is compatible with the computer system 600b in which it has been installed.

The original FRU 608a is removed from the FRU slot 616a and replaced with the new FRU 608e (step 402). As described above with respect to FIG. 1, this step may be performed by a human technician. The method 400 identifies the new FRU 608e (step 404) and obtains the revision compatibility matrix 500 (step 406). Steps 404 and 406 may be performed in the same manner as steps 104 and 106 in the method 100 (FIG. 1).

The method 400 determines whether the FPU code installed in the new FPU 602e (e.g., FPU code 604e) is different than the code (e.g., code 604a) installed in the old FRU 608a (step 408). The method 400 may make this determination in any of a variety of ways. For example, the method 400 may identify the code revision numbers of the old code 604a and the new code 604e using any of the techniques described above with respect to FIGS. 3A-3C, and then compare the code revision numbers to each other to determine whether they are the same.

If the old code 604e and the new code 604a are the same, the method 400 terminates (step 416). Otherwise, the method 400 informs the user 616 of the FPU code 604a in the old FRU 608a (step 410). The old FPU code 604a is an example of compatible code that may be installed in the new FPU 602e to make it compatible with the FRUs 608b-e and the remaining FPUs 602b-d. The method 400 may inform the user 616 of the old FPU code 604a in any of a variety of ways, such as by providing the user 616 with the code revision number of the old FPU code 604a.

The method 400 obtains the compatible code identified in step 410 (step 412) and installs the compatible code in the new FRU 608e (step 414). In the present example, step 414 may be implemented by installing the old FPU code 604a in the new FPU 602e. Steps 412 and 414 may, for example, be performed in the same manner as steps 116 and 118 in method 100 (FIG. 1). Upon installation of the compatible code in the new FRU 608e, the new FRU 608e should be able to operate in a manner that is compatible with the remaining FRUs 608b-d.

One advantage of the techniques disclosed herein is that they facilitate the process of ensuring that the FPU code in a newly-installed FRU is compatible with the other FRUs in a computer system and the FPU code installed in them. In particular, the techniques disclosed herein may be used to automatically ascertain whether the code 604e in the new FPU 602e is compatible with the code 604b-d in the remaining FPUs 602b-d. As described above, in conventional systems, upon installing a new FRU in a computer system, the user must manually determine whether the new FRU and the code installed in it are compatible with the remaining FRUs and the code installed in them. This typically requires the user to refer to a table that indicates the compatibility of the FRU and its code with other FRUs and their code. This can be tedious, time-consuming, and error prone. By enabling the compatibility-checking process to be performed automatically by computer operations, the techniques disclosed herein may enable compatibility-checking to be performed more quickly, easily, and reliably than is possible manually.

Furthermore, by enabling the automatic installation of compatible code in the new FRU 608e, the techniques disclosed herein further simplify the process of ensuring that the code 604e in the newly-installed FRU 608e is compatible with the code 604b-d in the remaining FRUs 608b-d. In particular, automatic installation may both decrease the total amount of time required to install compatible code in the new FRU 608e and eliminate the possibility that incorrect code will be installed in the FRU 608e.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

Elements and components described herein may be further divided into additional components or joined together to form fewer components for performing the same functions.

Although the revision compatibility matrix 500 is illustrated in FIG. 5 as a two-dimensional matrix, this is not, a limitation of the present invention. Rather the revision compatibility matrix 500 may be implemented in the form of any appropriate data structure and may therefore be considered more generally to be a "revision compatibility descriptor" that describes the compatibility of various FPU codes with each other. For example, although the particular revision compatibility matrix 500 shown in FIG. 5 lists complete sets of mutually-compatible FRUs and FPU codes, the revision compatibility matrix 500 may, for example, indicate pairs, triplets, or other combinations of mutually-compatible FRUs and FPU codes that do not specify a complete recipe.

Although the particular embodiment of the revision compatibility matrix 500 shown in FIG. 5 uses integral revision numbers to identify FRUs and FPU codes, this is not a limitation of the present invention. Rather, any kind of identifying information may be used to specify particular FRUs and FPU codes and to determine whether two particular instances of FRUs or FPU codes are the same or differ from each other. For example, the bits in sets of FPU code may be compared directly to each other to determine whether they are the same, thereby eliminating the need to use separate revision numbers or other identifying information.

The revision compatibility matrix 500 may or may not be stored permanently in the computer system 600. For example, the revision compatibility matrix 500 may be downloadable from a remote location into the computer system 600 at or around the time that the original FRU 608a is replaced with the new FRU 608e. The matrix 500 may be used to perform the functions disclosed herein and then be deleted.

Computer systems suitable for use in embodiments of the present invention may include any number of FPUs and/or FRUs in any combination. An FRU may include zero or more FPUs. Furthermore, although the FPUs 602a-e illustrated in FIGS. 6A-6B are shown as distinct sub-components of the FRUs 608a-e, respectively, this is not a requirement of the present invention. Rather, an FRU may itself be an FPU which contains its own code.

The method steps, techniques and elements (such as the compatibility verifier 610, code installer 618, and revision compatibility matrix 500) described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming-language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMS. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a computer system including a first field-programmable unit including first field-programmable unit (FPU) of a first type, the first FPU including first field-programmable code, a second FPU of a second type including a second FPU code, a plurality of field-programmable units including a corresponding plurality of FPU codes, a computer-implemented method comprising steps of:
   (A) determining whether the first FPU and the first FPU code are compatible with the second FPU and second FPU code;
   (B) if the first FPU and the first FPU code are determined not to be compatible with the second FPU and second FPU code, notifying a user of the computer system of the incompatibility, wherein the step (A) comprises a step of:
   (A)(1) determining whether the first FPU code is compatible with at least one of the plurality of FPU codes, wherein the computer system further comprises a plurality of field-replaceable units, and wherein the step (A) further comprises a step of:

(A)(2) determining whether the first FPU code is compatible with the plurality of field-replaceable units, wherein the computer system further comprises a revision compatibility descriptor identifying a plurality of compatible combinations of field-programmable unit codes, and wherein the step (A)(1) comprises a step of determining that the first FPU code is compatible with the plurality of FPU codes if a combination of the first FPU code and the plurality of FPU codes is among the plurality of compatible combinations of field-programmable unit codes identified by the revision compatibility descriptor.

2. The method of claim 1, wherein the computer system further comprises a plurality of field-replaceable units and a revision compatibility descriptor identifying a plurality of compatible combinations of field-programmable unit codes and field-replaceable units, and wherein the step (A) comprises a step of determining that the first FPU code is compatible with the computer system if a combination of the first FPU code, the plurality of FPU codes, and the plurality of field-replaceable units is among the plurality of combination combinations of field-programmable unit codes and field-replaceable units identified by the revision compatibility descriptor.

3. The method of claim 1, wherein the first field-programmable unit comprises a field-replaceable unit.

4. The method of claim 1, wherein the step (A) is performed in response to installation of the first field-programmable unit in the computer system.

5. The method of claim 1, wherein the step (B) comprises a step of:
   (B)(1) providing the user with information descriptive of third FPU code that is suitable for storage in the first field-programmable unit and that is compatible with the second FPU code.

6. The method of claim 5, wherein the step (A) is performed in response to replacement of a third field-programmable unit with the first field-programmable unit, and wherein the third field-programmable unit includes the third FPU code.

7. The method of claim 5, and wherein the step (B)(1) comprises steps of:
   (B)(1)(a) identifying a compatible combination of field-programmable unit codes previously installed in the computer system;
   (B)(1)(b) identifying, in the identified combination of previously-installed field-programmable unit codes, an identifier of FPU code suitable for installation in the first field-programmable unit; and
   (B)(1)(c) providing the user with information descriptive of the FPU code identified by the identifier.

8. The method of claim 5, wherein the computer system further comprises a plurality of FPUs including a corresponding plurality of FPU codes, and a revision compatibility descriptor identifying a plurality of combinations of compatible field-programmable unit codes, and wherein the step (B)(1) comprises steps of:
   (B)(1)(a) identifying, in the revision compatibility descriptor, a record describing the plurality of FPU codes;
   (B)(1)(b) identifying, in the identified record, a code identifier identifying FPU code suitable for use in the first field-programmable unit; and
   (B)(1)(c) providing the user with information descriptive of the FPU code identified by the code identifier.

9. In a computer system including a first field-programmable unit FPU of a first type, the first FPU including first field-programmable unit code, a plurality of field-programmable units including a corresponding plurality of FPU codes, a plurality of field-replaceable units, an apparatus comprising:

a processor;

determination means for determining whether the first FPU and first FPU code are compatible with a second FPU and second FPU code, wherein the second FPU includes the second FPU code, and wherein the second FPU is of a second type that differs from the first type, and wherein both the first FPU and the second FPU are connected to the computer system;

notification means for notifying a user of the computer system that the first FPU and first FPU code are not compatible with the second FPU and second FPU code if the determination means determines that the first FPU and first FPU code are not compatible with the second FPU and second FPU code, wherein the determination means comprises:

means for determining whether the first FPU code is compatible with the plurality of FPU codes, wherein the determination means further comprises:

means for determining whether the first FPU code is compatible with the plurality of field-replaceable units, and     means for determining whether the first FPU code is compatible with the plurality of field-replaceable units, further comprising a revision compatibility descriptor identifying a plurality of compatible combinations of field-programmable unit codes, and wherein the determination means comprises means for determining that the first FPU code is compatible with the plurality of FPU codes if a combination of the first FPU code and the plurality of FPU codes is among the plurality of compatible combinations of field-programmable unit codes identified by the revision compatibility descriptor.

10. The apparatus of claim 9, wherein the computer system further comprises a plurality of field-replaceable units, wherein the apparatus further comprises a revision compatibility descriptor identifying a plurality of compatible combinations of field-programmable unit codes and field-replaceable units, and wherein the determination means comprises means for determining that the first FPU code is compatible with the computer system if a combination of the first FPU code, the plurality of FPU codes, and the plurality of field-replaceable units is among the plurality of combination combinations of field-programmable unit codes and field-replaceable units identified by the revision compatibility descriptor.

11. The apparatus of claim 9, wherein the notification means comprises means for providing the user with information descriptive of third FPU code that is suitable for storage in the first field-programmable unit and that is compatible with the second FPU code.

12. A storage medium readable by a computer in a computer system including a first field-programmable unit of a first type, the first field-programmable unit including first field-programmable unit (FPU) code, a plurality of field-programmable units including a corresponding plurality of FPU codes, a plurality of field-replaceable units, the storage medium tangibly embodying program instructions executable by the computer to perform method steps of:

(A) determining whether the first FPU and the first FPU code are compatible with a second FPU and second FPU code the computer system, wherein the second FPU includes the second FPU code, wherein the second FPU is of a second type that differs from the first type, and wherein both the first FPU and the second FPU are connected to the computer system; and     (B) if the first FPU and first FPU code are determined not to be compatible with the second FPU and second FPU code, notifying a user of the computer system of the incompatibility, wherein the step (A) comprises a step of:

(A)(1) determining whether the first FPU code is compatible with the plurality of FPU codes, wherein the step (A) further comprises a step of:

(A)(2) determining whether the first FPU code is compatible with the plurality of field replaceable units, wherein the computer system further comprises a revision compatibility descriptor identifying a plurality of compatible combinations of field-programmable unit codes, and wherein the step (A)(1) comprises a step of determining that the first FPU code is compatible with the plurality of FPU codes if a combination of the first FPU code and the plurality of FPU codes is among the plurality of compatible combinations of field-programmable unit codes identified by the revision compatibility descriptor.

13. The storage medium of claim 12, wherein the computer system further comprises a plurality of field-replaceable units and a revision compatibility descriptor identifying a plurality of compatible combinations of field-programmable unit codes and field-replaceable units, and wherein the step (A) comprises a step of determining that the first FPU code is compatible with the computer system if a combination of the first FPU code, the plurality of FPU codes, and the plurality of field-replaceable units is among the plurality of combination combinations of field-programmable unit codes and field-replaceable units identified by the revision compatibility descriptor.

14. The storage medium of claim 12, wherein the first field-programmable unit comprises a field-replaceable unit.

15. A computer system comprising:

a processor;

a first field-programmable unit (FPU) of a first type, the first FPU including first FPU code;

a second field-programmable unit (FPU) of a second type, the second FPU including second FPU code, wherein both the first FPU and the second FPU are connected to the computer system;

a compatibility verifier coupled to the first FPU and operable to determine whether the first FPU and the first FPU code are compatible with the second FPU and second FPU code the computer system, and to notify a user of the computer system of the incompatibility if the first FPU and first FPU code are determined not to be compatible with the second FPU and second FPU code,     a plurality of field-programmable units including a corresponding plurality of FPU codes, and wherein the compatibility verifier is further operable to determine whether the first FPU code is compatible with the plurality of FPU codes     a plurality of field-replaceable units, and wherein the compatibility verifier is further operable to determine whether the first FPU code is compatible with the plurality of field-replaceable units     a revision compatibility descriptor identifying a plurality of compatible combinations of field-programmable unit codes, and wherein the compatibility verifier is operable to determine that the first FPU code is compatible with the plurality of FPU codes if a combination of the first FPU code and the plurality of FPU codes is among the plurality of compatible combinations of field-programmable unit codes identified by the revision compatibility descriptor.

16. The computer system of claim 15, further comprising a plurality of field-replaceable units and a revision compatibility descriptor identifying a plurality of compatible combinations of field-programmable unit codes and field-replaceable units, and wherein the compatibility verifier is operable to determine that the first FPU code is compatible with the computer system if a combination of the first FPU code, the plurality of FPU codes, and the plurality of field-replaceable units is among the plurality of combination combinations of field-programmable unit codes and field-replaceable units identified by the revision compatibility descriptor.

17. The computer system of claim 15, wherein the first field-programmable unit comprises a field-replaceable unit.

18. A computer system comprising:
- a processor;
- a first field-programmable unit (FPU) comprising first FPU code;
- a second FPU comprising second FPU code;
- a compatibility verifier coupled to the first FPU, the compatibility verifier being operable to determine whether the first FPU code is different from the second FPU code and, if the first FPU code is determined to be different from the second FPU code, to notify a user of the computer system that the first FPU code is incompatible with the computer system,
- a plurality of field-programmable units including a corresponding plurality of FPU codes, and wherein the compatibility verifier is further operable to determine whether the first FPU code is compatible with the plurality of FPU codes,
- a plurality of field-replaceable units, and wherein the compatibility verifier is further operable to determine whether the first FPU code is compatible with the plurality of field-replaceable units,
- a revision compatibility descriptor identifying a plurality of compatible combinations of field-programmable unit codes, and wherein the compatibility verifier is operable to determine that the first FPU code is compatible with the plurality of FPU codes if a combination of the first FPU code and the plurality of FPU codes is among the plurality of compatible combinations of field-programmable unit codes identified by the revision compatibility descriptor.

19. The computer system of claim 18, wherein the first FPU comprises a field-replaceable unit.

20. The computer system of claim 18, wherein the compatibility verifier is operable to provide the user with information descriptive of third FPU code that is suitable for storage in the first FPU and that is compatible with the computer system.

21. In a computer system including a first field-programmable unit (FPU) of a first type, the first FPU including first FPU code, a plurality of field-programmable units including a corresponding plurality of FPU codes, a plurality of field-replaceable units a computer-implemented method comprising steps of:
- (A) determining whether the first FPU and first FPU code are compatible with a second FPU and second FPU code wherein both the first FPU and the second FPU are in the computer system, wherein the second FPU includes the second FPU code, and wherein the second FPU is of a second type that differs from the first type;
- (B) if the first FPU and first FPU code are determined not to be compatible with the second FPU and second FPU code, identifying third FPU code that is compatible with the computer system and suitable for installation in the first field-programmable unit; and
- (C) installing the third FPU code in the first field-programmable unit, and wherein the step (A) comprises a step of:
- (A)(1) determining whether the first FPU code is compatible with the plurality of FPU codes,
wherein the step (A) further comprises a step of:
- (A)(2) determining whether the first FPU code is compatible with the plurality of field-replaceable units, wherein the computer system further comprises a revision compatibility descriptor identifying a plurality of compatible combinations of FPU codes, and wherein the step (A)(1) comprises a step of determining that the first FPU code is compatible with the plurality of FPU codes if a combination of the first FPU code and the plurality of FPU codes is among the plurality of compatible combinations of FPU identified by the revision compatibility descriptor.

22. The method of claim 21, wherein the computer system further comprises a plurality of field-replaceable units and a revision compatibility descriptor identifying a plurality of compatible combinations of field-programmable unit codes and field-replaceable units, and wherein the step (A) comprises a step of determining that the first FPU code is compatible with the computer system if a combination of the first FPU code, the plurality of FPU codes, and the plurality of field-replaceable units is among the plurality of combination combinations of FPU codes and field-replaceable units identified by the revision compatibility descriptor.

23. The method of claim 21, wherein the first field-programmable unit comprises a field-replaceable unit.

24. The method of claim 21, wherein the step (A) is performed in response to installation of the first field-programmable unit in the computer system.

25. In a computer system including a first field-programmable unit (FPU) of a first type, the first FPU including first FPU code, an apparatus comprising:
- a processor;
- determination means for determining whether the first FPU and first FPU code are compatible with a second FPU and second FPU code, wherein both the first FPU and the second FPU are in the computer system, wherein the second FPU includes the second FPU code, and wherein the second FPU is of a second type that differs from the first type;
- identification means for identifying third FPU code that is compatible with the computer system and suitable for installation in the first field-programmable unit if the first FPU and first FPU code are determined not to be compatible with the second FPU and second FPU code;
- installation means for installing the third FPU code in the first field-programmable unit, wherein the computer system further comprises a plurality of field-programmable units including a corresponding plurality of FPU codes, and wherein the determination means comprises:
- means for determining whether the first FPU code is compatible with the plurality of FPU codes, wherein the computer system further comprises a plurality of field-replaceable units, and wherein the determination means further comprises:
- means for determining whether the first FPU code is compatible with the plurality of field-replaceable units, wherein the computer system further comprises a revision compatibility descriptor identifying a plurality of compatible combinations of FPU codes, and wherein the determination means comprises means for determining that the first FPU code is compatible with the plurality of FPU codes if a combination of the first FPU code and the plurality of FPU codes is among the plurality of compatible combinations of FPU identified by the revision compatibility descriptor.

26. The apparatus of claim 25, wherein the computer system further comprises a plurality of field-replaceable units and a revision compatibility descriptor identifying a plurality of compatible combinations of field-programmable unit codes and field-replaceable units, and wherein the determination means comprises means for determining that the first FPU code is compatible with the computer system if a combination of the first FPU code, the plurality of FPU codes, and the plurality of field-replaceable units is among the plurality of combination combinations of FPU codes and field-replaceable units identified by the revision compatibility descriptor.

27. A storage medium readable by a computer in a computer system including a first field-programmable unit (FPU) of a first type, the first FPU including first FPU code, a plurality of field-programmable units including a corresponding plurality of FPU codes, a plurality of field replaceable units including a corresponding plurality of FPU codes, the storage medium tangibly embodying program instructions executable by the computer to perform method steps of:
  (A) determining whether the first FPU and first FPU code are compatible with a second FPU and second FPU, wherein both the first FPU and the second FPU are in the computer system, wherein the second FPU includes the second FPU code, and wherein the second FPU is of a second type that differs from the first type;
  (B) if the first FPU code is determined not to be compatible with the computer system, identifying third FPU code that is compatible with the computer system and suitable for installation in the first field-programmable unit; and
  (C) installing the third FPU code in the first field-programmable unit wherein the step (A) comprises a step of:
  (A)(1) determining whether the first FPU code is compatible with the plurality of FPU codes,
  (A)(2) determining whether the first FPU code is compatible with the plurality of field-replaceable units, wherein the computer system further comprises a revision compatibility descriptor identifying a plurality of compatible combinations of FPU codes, and wherein the determination means comprises means for determining that the first FPU code is compatible with the plurality of FPU codes if a combination of the first FPU code and the plurality of FPU codes is among the plurality of compatible combinations of FPU identified by the revision compatibility descriptor.

28. The storage medium of claim 27, wherein the computer system further comprises a plurality of field-replaceable units and a revision compatibility descriptor identifying a plurality of compatible combinations of field-programmable unit codes and field-replaceable units, and wherein the step (A) comprises a step of determining that the first FPU code is compatible with the computer system if a combination of the first FPU code, the plurality of FPU codes, and the plurality of field-replaceable units is among the plurality of combination combinations of FPU codes and field-replaceable units identified by the revision compatibility descriptor.

29. A computer system comprising:
  a processor;
  a first field-programmable unit (FPU) of a first type, the first FPU including first FPU code;
  a compatibility verifier coupled to the first FPU and operable to determine whether the first FPU and first FPU code are compatible with a second FPU and second FPU code, wherein both the first FPU and the second FPU are connected to the computer system, and, if the first FPU and first FPU code are determined not to be compatible with the second FPU and second FPU code, to identify third FPU code that is compatible with the computer system and suitable for installation in the first field-programmable unit;
  a code installer coupled to the first FPU and operable to install the third FPU code in the first field-programmable unit, further comprising a plurality of FPUs including a corresponding plurality of FPU codes, and wherein the compatibility verifier is operable to determine whether the first FPU code is compatible with the plurality of FPU codes, further comprising a plurality of field-replaceable units, and wherein the compatibility verifier is operable to determine whether the first FPU code is compatible with the plurality of field-replaceable units, further comprising a revision compatibility descriptor identifying a plurality of compatible combinations of FPU codes, and wherein the compatibility verifier is operable to determine that the first FPU code is compatible with the plurality of FPU codes if a combination of the first FPU code and the plurality of FPU codes is among the plurality of compatible combinations of FPU identified by the revision compatibility descriptor.

30. The computer system of claim 29, further comprising a plurality of field-replaceable units and a revision compatibility descriptor identifying a plurality of compatible combinations of field-programmable unit codes and field-replaceable units, and wherein the compatibility verifier is operable to determine that the first FPU code is compatible with the computer system if a combination of the first FPU code, the plurality of FPU codes, and the plurality of field-replaceable units is among the plurality of combination combinations of FPU codes and field-replaceable units identified by the revision compatibility descriptor.

* * * * *